May 21, 1963  A. J. TOTI  3,090,073
FOWL PICKING APPARATUS
Filed June 25, 1953
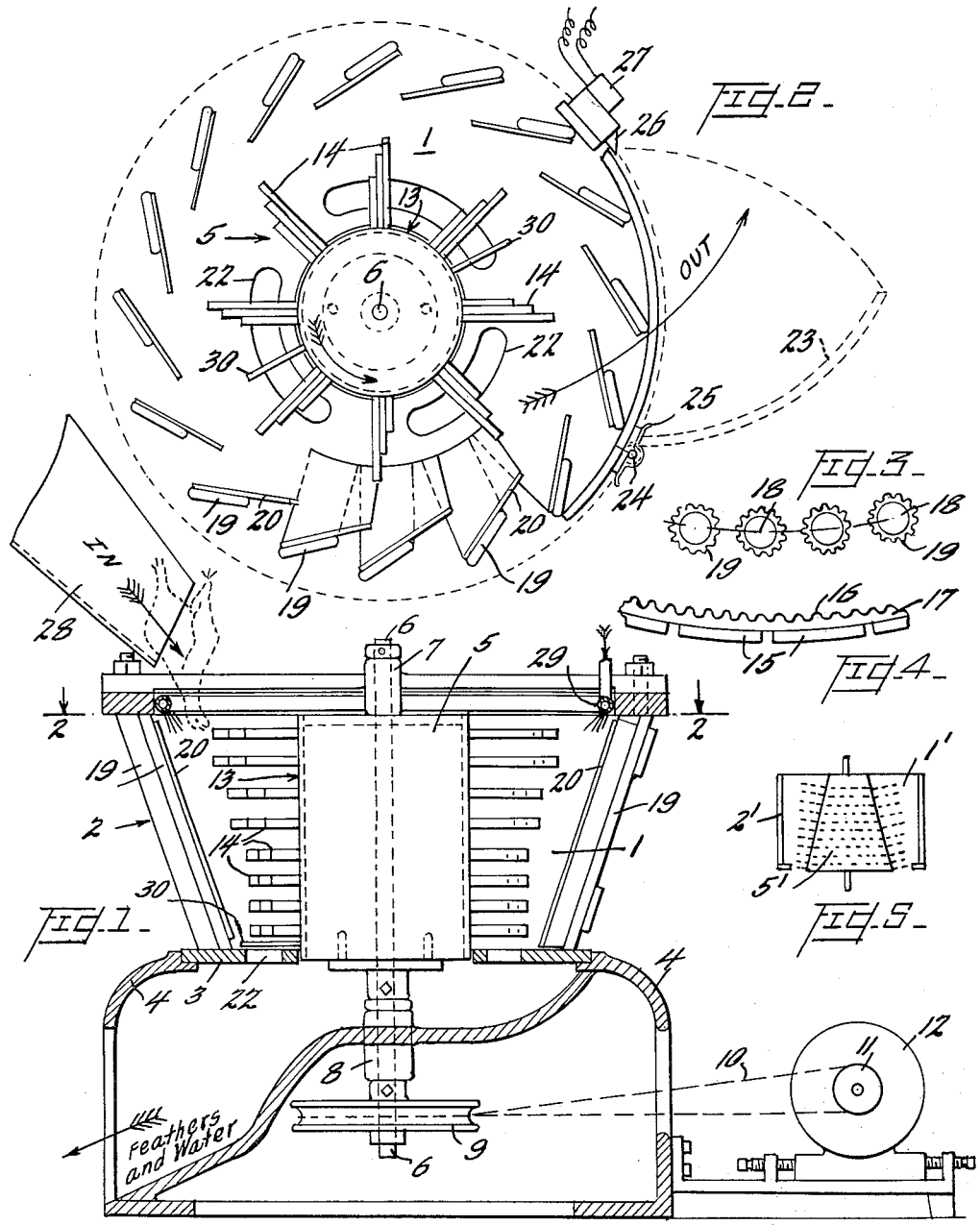
INVENTOR
Andrew J. Toti,
BY Watson, Cole, Grindle & Watson
ATTORNEYS 3,090,073
FOWL PICKING APPARATUS
Andrew J. Toti, Modesto, Calif., assignor, by mesne assignments, to International Rectifier Corporation, El Segundo Calif., a corporation of California
Filed June 25, 1953, Ser. No. 364,044
13 Claims. (Cl. 17—11.1)

This invention relates to that type of fowl or chicken apparatus wherein the fowls are introduced into the apparatus in loose condition and free to turn and tumble about by the action of the apparatus in operation and are automatically picked all over. More particularly the present apparatus constitutes an improvement over the similar form of apparatus shown in FIG. 4 of my co-pending patent application filed under Serial No. 245,571 on Sept. 7, 1951, now Patent No. 2,805,443.

The principal objects of the present invention are to provide a better picking action, a structure which will accommodate various sizes of fowls, even several at the same time, and will automatically eject the completed birds, also an apparatus or machine which will better discharge the feathers. Other advantages of the invention will appear in the following description and in the accompanying drawings.

In the drawings,

FIG. 1 is an elevation mostly in section to show the inner relation of the parts, and as the hopper of the machine is substantially round it shows the general construction clearly.

FIG. 2 is a plan sectional view of the hopper of the machine of FIG. 1 as taken along the line 2—2 thereof with but three of the slats being shown in full, as these are representative of all the slats.

FIG. 3 is a cross-sectional detail of an optional construction of the hopper wall.

FIG. 4 is another variation in the construction of the hopper wall.

FIG. 5 is a small diagram showing in vertical section a modified form of the hopper and its central rotary beater.

Briefly described the apparatus in its simplest form may be said to comprise an open top receptacle, or hopper 1 preferably round and with an upwardly flaring wall 2 and a substantially open bottom except for a ring or supporting ledge 3 to which the legs or lower base frame 4 of the machine is secured or united.

Within the hopper is a vertically positioned "rotor" or rotary "beater" 5 secured to a drive shaft 6 rotatably supported in suitable bearings 7, 8, and which shaft is driven by any suitable means, here indicated as from a pulley 9 at it slower end connected as by a belt 10 to a driving pulley 11 on a motor 12. The type of drive of course being of wide choice.

The rotary beater 5 which also may vary widely in its construction is here indicated as having a central cylindrical hub or drum 13 studded outside with spaced soft flexible friction elements 14 (generally termed "fingers" in the fowl defeathering art) which may be of conventional form, but are here shown as of small groups of plain rubber strips of rectangular cross section (see FIG. 2) and preferably, tho not absolutely necessarily, they are longer toward the upper end of the beater where the hopper widens out.

The wall of the flaring hopper may be a plain wall member as at 15 in FIG. 4 made continuous, or of slats and provided with ribs inside as at 16 which may be formed on or attached to the wall or may be carried on a layer 17 of sheet material such as a sheet of ribbed rubber secured to the inner side of the hopper, and with the ribs running vertically. Or, the wall may be made of upright wooden bars 18 spaced apart to pass feathers yet not enough to permit a chicken leg or wing tip to get caught in. Or, such bars 18 may be of metal and themselves be covered with other friction materials such as short lengths of outwardly ribbed garden hose 19.

In FIG. 2 the "wall" of the hopper is shown as made of upright slats 19 with rounded edges. The slats are suitably secured in place at their upper and lower ends, and are spaced and also extend in an overlapping though open arrangement (shingle fashion) "pointing" (in the plan section FIG. 2) in direction of rotation of the beater and consequent movement of the fowls being treated, as this arrangement permits of wide spacing of the slats yet effectually prevents any part of the rotating fowls from entering.

Besides this angular arrangement of slats there may be a thin sheet or strip of flat vertically ribbed rubber 20 secured to each slat to extend over the inner surface of the slats to offer more friction or retardation to the fowls as they are carried around the hopper by the rotating beater—and of course, this retarding friction also does considerable work in removing the feathers from the fowls.

The lower end of the hopper is partially closed by the ring or supporting ledge 3 which is provided with a series of arcuate slots 22 as indicated in FIG. 2 for the loose feathers to fall out, tho this may be aided by one or more small scraping rods projecting out from the lower end of the rotor as at 30.

At one side of the hopper is an outwardly swinging gate 23 embracing several slats or bars and which gate is hinged at 24 along one upright edge by hinges fitted with closing springs 25 strong enough to normally snap the gate closed to lock with a spring latch indicated at 26, all so that at any time the latch is tripped the outward pressure exerted by the rotating fowls in the hopper will at once eject them all, and whereupon the gate will snap closed again.

Obviously the gate latch may be opened manually by hand, or by any desired foot trip connection, but for high production it should open at definite intervals for the ejection of the fowls after a predetermined time of picking interval (generally from 6 to 18 seconds, depending on the character of the fowl and speed of the beater) and any automatic intermittent operating device such as intermittent gears operated from the drive motor or any little auxiliary motor may be used for this purpose, or the latch may be tripped directly by a time adjustable electric thermostatic or other intermittent device as indicated at 27 in the drawing. The details of such auxiliary devices are numerous and well understood in the art, and therefore not shown here.

In operation, the beater is set in motion and from one to several (depending on the size of the apparatus) chickens *x* or other fowl are dropped from the feed chute 28 one right after the other into the machine. The fowls will at once assume a circular row within the hopper and rotate therearound while at the same time be turned individually and tumbled in every direction, so that when the gate is unlatched a few seconds later they will all be thrown out by centrifugal force, the gate will snap closed and a new load will at once be introduced by any suitable conveyer and feeding mechanism well understood in the art.

As an example of a successfully operating apparatus in terms of dimensions and rotating speed, tho not to be taken as limiting in any way, as considerable variations in sizes and speed of operation may be made, it may be stated that a hopper of about 34 inches inner diameter on top, bottom 24", height 16", rotor 15", hub 16" long, fingers about 3½" long, 14" driving pulley on rotor shaft, and about a 3½" pulley on 1750 r.p.m. motor, gave very satisfactory results in as low as 6 seconds on pre-scalded chickens, and carried four chickens at one time.

The great efficiency of the machine is due to the fact that both the rotating and stationary portion of the fowl holder are active about their entire circumferences against the fowls and the fowls if of different sizes are all free to rise or fall in the flaring hopper or bowl space to assume the best place to suit their size, and if due to centrifugal force they rise up in the bowl or hopper to lose contact with the beater they will drop again to regain it. However, it appears far more effective than a plain cylindrical wall, and the tapered effect could be had by a mere reversal of the shape of hopper and rotor as indicated in FIG. 5 wherein the beater 5' is an inverted cone and the hopper 1' cylindrical, and any such variations are intended to be covered in the appended claims.

Also to be noted is that while the hopper is shown as being horizontally disposed and with beater axis vertical, the machine was tried out by tilting it at various angles transversely of the drawing when held vertically, up to about 45 degrees or somewhat more, and its efficiency did not seem much affected, while drainage of feathers could be somewhat improved. The claims are therefore drawn to include any such lateral extension of the hopper about its upwardly extending axis.

However, as water (preferably hot) is desirably sprayed downward from a ring pipe 29, in the vertical arrangement the loose feathers are washed downward to pass through the circular slots 22 to discharge chute, tho some will be thrown through the slat spaces if wide enough and in which case a suitable outer sheet metal guard may be used if desired.

From what has been shown and described it is obvious that the machine can be made of any size, even to taking a dozen fowl at a time if desired, or to take large turkeys, tho the size given will accommodate all the ordinary run of chickens as they can assume different positions in the flaring hopper.

I claim:

1. In a fowl defeathering apparatus, the combination of a rotary defeathering beater studded with spaced projecting flexible feather engaging frictional elements and with its axis extending upwardly, means for rapidly revolving said beater, means forming a hopper spacedly surrounding said beater of a size to receive and retain fowls for defeathering by striking with said beater, said hopper and beater relatively formed to provide between them a downwardly converging space to urge the fowls into contact with the beater.

2. In a structure as set out in claim 1 an opening at the bottom of the hopper of a size to pass released feathers but not the fowl.

3. In a structure as set out in claim 1 an opening at the bottom of the hopper of a size to pass released feathers but not the fowl, and a feather scraper projecting from the beater adjacent said opening.

4. In a structure as set out in claim 1, the wall of the hopper comprising upwardly extending circularly spaced rigid members supporting inwardly extending flaps of flexible friction material.

5. In a fowl defeathering apparatus, the combination of a rotary defeathering beater studded with spaced projecting flexible feather engaging frictional elements and with its axis extending upwardly, means for rapidly revolving said beater, wall means forming a hopper spacedly surrounding said beater of a size to receive and retain fowls for defeathering by striking with said beater, said hopper and beater relatively formed to provide between them a downwardly converging space to urge the fowls into contact with the beater, the wall means of the hopper slanting downward and inward toward the beater.

6. In a structure as set out in claim 5, said feather engaging frictional elements being elongated finger-like members of greater length at the upper portion of the beater than at the lower portion.

7. In a fowl defeathering apparatus, the combination of a rotary defeathering beater studded with spaced projecting flexible feather engaging frictional elements and with its axis extending upwardly, means for rapidly revolving said beater, means forming a hopper spacedly surrounding said beater of a size to receive and retain fowls for defeathering by striking with said beater, said hopper and beater relatively formed to provide between them a downwardly converging space to urge the fowls into contact with the beater, the wall of the hopper slanting downward and inward toward the beater and the beater being substantially cylindrical.

8. In a fowl defeathering apparatus, the combination of a rotary defeathering beater studded with spaced projecting flexible feather engaging frictional fingers and with its axis extending upwardly, means for rapidly revolving said beater, means forming a stationary hopper spacedly surrounding said beater of a size to receive and retain loose fowls free for tumbling about within the hopper and for defeathering by striking with the fingers of said beater when revolving, and flexible frictional elements on the inner side of the hopper arranged to contact the fowls to retard bodily movement of the fowls and aid in tumbling them about, said rotary beater being of conical form with its smaller end uppermost.

9. In a fowl defeathering apparatus, the combination of a rotary defeathering beater studded with spaced projecting flexible feather engaging frictional fingers and with its axis extending upwardly, means for rapidly revolving said beater, means forming a hopper spacedly surrounding said beater of a size to receive and retain fowls for defeathering by striking with said beater, said hopper comprising a wall formed with circumferentially spaced members slanted downwardly toward said beater.

10. In a fowl defeathering apparatus, the combination of a rotary defeathering beater studded with spaced projecting flexible feather engaging frictional fingers and with its axis extending upwardly, means for rapidly revolving said beater, means forming a hopper spacedly surrounding said beater of a size to receive and retain fowls for defeathering by striking with said beater, said hopper comprising a wall formed with circumferentially spaced flexible friction baffles slanted downwardly toward said beater.

11. In a fowl defeathering apparatus, the combination of a rotary fowl defeathering beater studded with spaced projecting flexible frictional feather engaging fingers and having its axis extending upwardly, means for rapidly revolving said beater, means forming a fixed upright receptacle surrounding said beater of a size to receive and retain loose fowls for defeathering by striking with said fingers when rotating, and frictional elements projecting inwardly from the inner side of the receptacle positioned to engage the fowls to retard bodily movement and aid in tumbling the fowls about, said receptacle having an opening in its side, a gate supported on said apparatus to normally cover said opening when the beater is rotating to defeather the loose fowl within the receptacle, and movable to uncover said opening for lateral ejection of the fowls therethrough by centrifugal force imparted to the fowls by the beater when the desired defeathering is completed.

12. A fowl defeathering apparatus as claimed in claim 11, wherein at least one of said frictional elements is carried by said gate.

13. A fowl defeathering apparatus as claimed in claim 11 which comprises means for automatically operating said gate upon predetermined time intervals.

References Cited in the file of this patent

UNITED STATES PATENTS

| | | |
|---|---|---|
| 456,077 | Bartholomew | July 14, 1891 |
| 745,658 | Perry et al. | Dec. 1, 1903 |
| 1,637,830 | Mannsdorff | Aug. 2, 1927 |
| 2,326,356 | Haslam | Aug. 10, 1943 |
| 2,569,156 | Dybvig | Sept. 25, 1951 |

FOREIGN PATENTS

| | | |
|---|---|---|
| 2,920 | Great Britain | A.D. 1882 |